Figure 1:
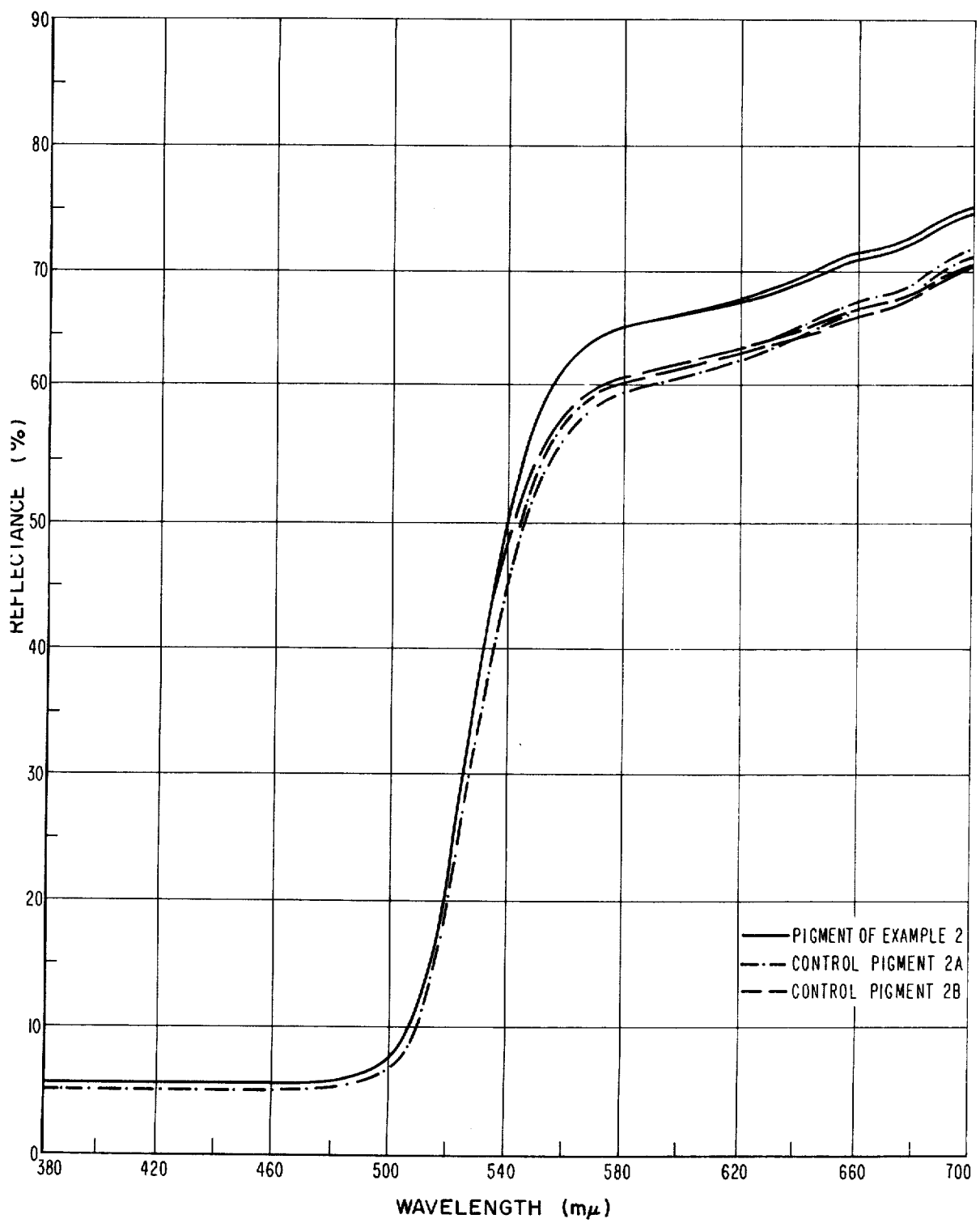

United States Patent [19]

Ziobrowski

[11] 4,054,465

[45] Oct. 18, 1977

[54] LEAD CHROMATE PIGMENTS

[75] Inventor: Bernard George Ziobrowski, Glens Falls, N.Y.

[73] Assignee: Hercules Incorporated, Wilmington, Del.

[21] Appl. No.: 727,926

[22] Filed: Sept. 29, 1976

[51] Int. Cl.$^2$ .............................................. C09C 1/20
[52] U.S. Cl. ................................. 106/298; 106/308 Q
[58] Field of Search .................... 106/298, 308 Q, 309

[56] References Cited

U.S. PATENT DOCUMENTS

| | | | |
|---|---|---|---|
| 3,773,535 | 11/1973 | Burgyan et al. | 106/298 |
| 3,849,152 | 11/1974 | Mimeault | 106/308 Q |
| 3,956,005 | 5/1976 | Sugahara et al. | 106/308 B |

*Primary Examiner*—Winston A. Douglas
*Assistant Examiner*—J. V. Howard
*Attorney, Agent, or Firm*—Hazel L. Deming

[57] ABSTRACT

Lead chromate-containing pigments having improved dispersibility, heat stability and resistance to abrasion in thermoplastic systems are described. The improved pigments of this invention comprise silica coated lead chromate-containing pigment particles having absorbed on their coated surfaces from 1 to 15% based on the weight of the coated particles of certain liquid organopolysiloxanes. The pigments are produced by contacting silica-coated lead chromate-containing pigment particles with the desired amount of the liquid organopolysiloxane and recovering the resulting particles, both of the contacting and recovery steps being carried out under conditions which do not effect substantial polymerization or curing of the organopolysiloxane.

10 Claims, 2 Drawing Figures

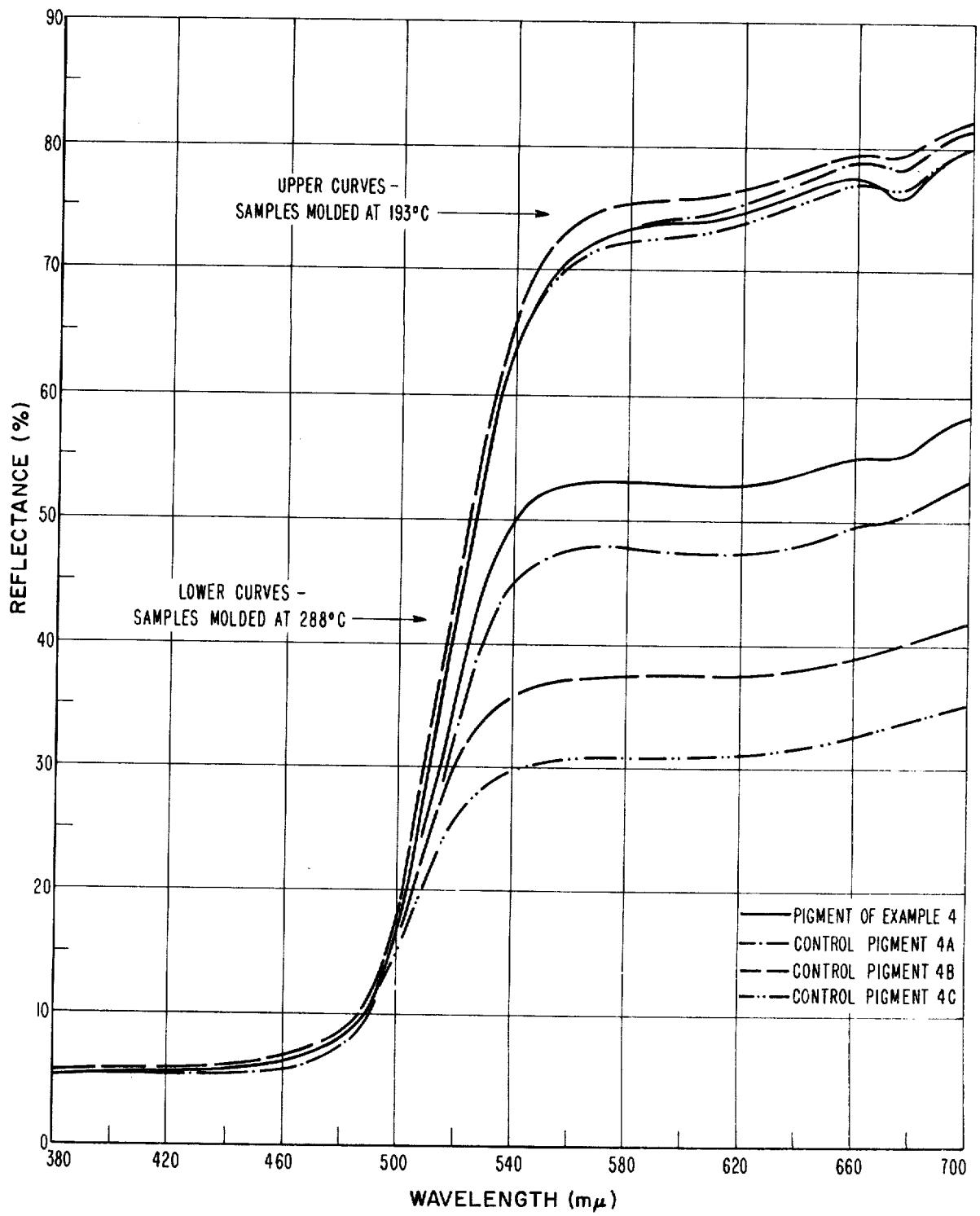

LEAD CHROMATE PIGMENTS

This invention relates to lead chromate-containing pigments and more particularly to free-flowing, silica-coated lead chromate-containing pigments having improved dispersibility, heat stability and resistance to abrasion, shear or impact in thermoplastic systems, and to a process for their manufacture.

Lead chromate pigments are widely known and are available in a broad spectrum of shades ranging from the very green shade "Primrose Yellow" in rhombic crystal form to the orange and yellowish red molybdate colors which are solid solutions of lead chromate, lead sulfate and lead molybdate in tetragonal crystal form. Intermediate thereof are the lemon yellow colors which are solid solutions of lead chromate and lead sulfate, usually in monoclinic form and a relatively pure lead chromate in monoclinic crystalline form which is much redder and is commonly known as "Medium Yellow".

Although the lead chromate-containing pigments are relatively inexpensive to manufacture and generally have good tinctorial properties, they have certain notable deficiencies, outstanding of which is the tendency of the pigment to darken when used to color thermoplastic resins, and particularly the polyethylene and polystyrene resins which are processed at temperatures above 220° C. In fact, it is well recognized that lead chromate pigments cannot be used to color thermoplastic resins at temperatures above about 210° C. without serious darkening and that the darkening becomes more pronounced as the temperature is further elevated. Thus, there exists a serious need for a method of treating lead chromate pigments to enable their general use in coloring thermoplastic resins.

One method which has been proposed to overcome the deficiencies of the lead chromate pigments is described by Linton in U.S. Pat. No. 3,370,971 (FEB. 27, 1968) and involves coating lead chromate pigments with from 2 to 40% of dense amorphous silica deposited as a continuous coating on the pigment particles from an aqueous solution of "active" silica at a pH above 6. The silica-coated pigments of the type described by Linton perform satisfactorily in some applications but usually do not possess sufficient protection to preserve good color stability when used for coloring thermoplastic resins.

One of the reasons for the unsatisfactory performance of the silica-coated pigments in thermoplastic systems relates to the poor abrasion resistance of the silica coating. In the conventional method for coloring thermoplastic resins with pigments, the dried pigment is mixed with the solid granular resin and the resulting mixture is then subjected to vigorous kneading until homogeneity is obtained. The rigorous requirements of compounding tend to abraid the silica coating on lead chromate pigments and result in a deterioration of the chemical, thermal, and light resistance of the pigment. This shortcoming of silica-coated pigments has been recognized by the art and various procedures have been suggested to overcome the difficulty. One such method is proposed by Linton in U.S. Pat. No. 3,636,133 (FEB. 1, 1972) and concerns subjecting the lead chromate pigment particles to intense shear to break up agglomerates prior to coating the particles with the silica. Another method is described by Burgyan et al. in U.S. Pat. No. 3,773,535 (Nov. 20, 1973) and is directed to encapsulating the silica-coated pigment particles in polyolefin wax. Still another method is described by Linton in U.S. Pat. No. 3,470,007 (Sept. 30, 1969) and concerns treating the silica-coated pigment particles with certain metal salts of rosin acids or long chain fatty acids to help secure the silica deposition to the pigment particle. Silica-coated pigment particles treated in accordance with the above procedures have improved abrasion resistance over their nontreated silica-coated counterparts. However, thermal stability in thermoplastic systems is only moderately good and processing conditions must be carefully controlled to preserve color stability and avoid degradation of the coating.

Another method which has been proposed to overcome the poor thermal stability of the lead chromate pigments is described in U.S. Pat. No. 3,849,152 (Nov. 19, 1974) to Mimeault and involves encapsulating the pigment particles with from about 5 to about 35% of a solid polysiloxane. In this process the pigment particles are coated with a solution of a polymerizable siloxane (monomer or liquid curable prepolymer) and a solid polysiloxane coating or encapsulation is formed by polymerization (or curing) in situ. Encapsulation of the pigment particles in the solid polysiloxane is said to insulate the pigment from heat and light and hence avoid degradation and loss of color strength and also to provide improved dispersion, abrasion resistance and moisture resistance. The polysiloxane encapsulated lead chromate pigments, however, do not possess as good color and heat stability as the silica-coated lead chromate pigments. Hence, any advantages realized by improved dispersibility are completely offset by the tendency of the pigment to darken at elevated temperatures.

Yet another method which has been proposed to improve the poor chemical resistance, thermal stability and weatherability of the lead chromate pigments is described by Sugahara et al. in U.S. Pat. No. 3,956,005 (May 11, 1976). In Sugahara et al.'s process the pigment particles are covered with a continuous coating of a solid glass type of silica deposited from an aqueous solution of an alkali polysilicate having a pH of at least 11. The glass-coated pigments are said to have improved resistance to chemicals and abrasion as compared with the dense amorphous silica coated pigments described by Linton in U.S. Pat. No. 3,370,971. The dispersibility characteristics of the glass-coated pigments in thermoplastic resins, however, are poor and extensive milling under carefully controlled conditions is required to achieve adequate color development without adversely affecting the properties of the resin.

Thus, the effectiveness of the lead chromate-containing pigments as colorants for thermoplastics would be enhanced if their heat stability, chemical and abrasion resistance and dispersibility characteristics could be improved without detriment to the desirable properties of the lead chromate pigments or the thermoplastic resins in which they are incorporated.

Now in accordance with the present invention it has been found that the deficiencies of the amorphous or glass type of silica-coated lead chromate pigments of the prior art can be avoided and that lead chromate-containing pigments having improved heat stability, abrasion resistance and good dispersibility characteristics can be produced by treating the silica-coated lead chromate pigment particles with certain liquid polysiloxanes under conditions which do not effect substantial polymerization or curing of the polysiloxane.

Accordingly, the present invention relates to an improved pigment consisting essentially of lead chromate-containing particles having on their surfaces a substantially continuous coating of dense amorphous silica, dense amorphous silica and alumina or a solid, glass-like alkali polysilicate, the improvement of which comprises said pigment particles having absorbed on the coated surfaces thereof a liquid organopolysiloxane containing repeating units of the formula

where R and R' are hydrocarbyl groups in an amount from 1 to 15% of the weight of the coated particles, the improved pigment being free-flowing and having in thermoplastic systems improved dispersibility characteristics, heat stability and resistance to mechanical destruction by abrasion, shear or impact.

The invention also relates to a process for producing the improved pigments wherein, in a process for producing a coated lead chromate-containing pigment, which process includes the step of depositing a substantially continuous coating of dense amorphous silica, dense amorphous silica and alumina or a solid, glass-like alkali polysilicate on the surfaces of particles of said pigment, the coated pigment particles are contacted with from 1 to 15% of the weight of the coated particles of a liquid organopolysiloxane containing repeating units of the formula

and the resulting pigment is recovered, said contacting and recovery steps being carried out under conditions which do not effect substantial polymerization or curing of the organopolysiloxane and the liquid organopolysiloxane is absorbed on the coated surface of the particles.

In the accompanying drawings

FIG. 1 is a graphical comparison of the reflectance curves for three, medium chrome yellow pigmented samples of polystyrene molded at 288° C., the straight line curve representing the sample containing the pigment of Example 2, and the broken line curves "— . —" and "—0 —" representing samples containing the silica-alumina coated control pigment 2A and the liquid polysiloxane-treated control pigment 2B, respectively; and FIG. 2 is a graphical comparison of the reflectance curves for four lemon yellow pigmented samples of polystyrene molded at 193° C. and at 288° C., the straight line curves representing the samples containing the pigment of Example 4, and the broken line curves "— . —", "— —" and "— . . —" representing the samples containing the silica-alumina coated control pigment 4A, the solid polysiloxane encapsulated control pigment 4B and the untreated control pigment 4C, respectively.

By the terms" lead chromate pigment" and "pigment containing lead chromate" are meant all pigments which include lead chromate as a major constituent. These range from relatively pure lead chromate in monoclinic form to solid solutions containing lead sulfate or lead molybdate or both as substantial components. Also included are the rhombic lead chromates stabilized in that crystal form in various ways such as by the addition of trivalent aluminum ions and pyrophosphate ions. Although basic lead chromate orange pigments have been largely supplanted in the trade by the molybdate oranges, they are to be included as pigments which may be treated as herein disclosed.

Among specific lead chromate pigments to which the invention is applicable ae the following, all references being to "Colour Index", 2nd edition, 1956, published jointly by the Society of Dyers and Colourists, England, and the American Association of Textile Chemists and Colorists, United States:

Chrome Yellow CI-77600
Basic Lead Chromate CI-77601
Lead Sulfochromate CI-77603
Molybdate Orange or Red CI-77605.

The preferred lead chromates include the very green shade primrose yellow in rhombic crystal form; the relatively pure lead chromate which is much redder, is in monoclinic crystal form and is commonly known as medium yellow; the intermediate shades which are solid solutions of lead chromate and lead sulfate and are usually in monoclinic form; and the molybdate oranges and reds in tetragonal or monoclinic form.

The improved lead chromate-containing pigments of this invention are produced by depositing on the lead chromate-containing pigment particles at least one substantially continuous coating of dense amorphous silica, with or without alumina, or a solid, glass-like alkali polysilicate and then contacting the coated particles with between 1 and 15% based on the coated particles weight of certain liquid organopolysiloxanes under conditions which do not effect substantial polymerization or curing of the organopolysiloxane. The deposition of a dense amorphous type of silica or silica and alumina upon the pigment particles is described in U.S. Pat. No. 3,370,971 to Linton and the deposition of a glass-like coating of an alkali polysilicate on pigment particles is described in U.S. Pat. No. 3,956,005 to Sugahara et al. and details of the methods disclosed therein are hereby incorporated by reference. In a preferred embodiment of the present invention the dense silica coating is deposited on the pigment particles by simultaneously but separately adding a sodium silicate solution and a mineral acid or ammonium sulfate or chloride solution to an aqueous slurry of the pigment particles at a pH within the range of about 9.0 to 9.5 ahd a temperature of at least 60° C. and preferably above 75° C.

The quantity of silica calculated as $SiO_2$ which is applied to the pigment particles as dense amorphous silica or a glass of an alkali polysilicate can vary over a range which will usually be from about 2 to about 40%, preferably from about 5 to about 35% and most preferably from about 15 to about 32% by weight of the coated particles. In a preferred embodiment the silica coating is dense amorphous silica and the coating also contains a small amount, usually from about 0.2 to about 10% and preferably from about 1 to about 5% by weight of the coated pigment of alumina deposited as a separate coating thereon. The inclusion of alumina as part of the coating aids in handling of the coated pigment and further enhances the heat stability of the pigment. The deposition of alumina on the silica-coated lead chromate particles is conveniently carried out by adding an aqueous solution of a soluble aluminum compound such as alum or sodium aluminate to the heated aqueous dispersion of the silica-coated lead chromate particles and continuing the agitation until deposition is complete.

Following application of the silica coating, as dense amorphous silica, dense amorphous silica and alumina or the glass-like alkali polysilicate, to the lead chromate particles, the coated particles are contacted with a liquid organopolysiloxane under conditions which do not effect substantial polymerization or curing of the polysiloxane. In this step of the process the liquid organopolysiloxane is absorbed on the coated surface of the particles and the step can be carried out in any convenient manner using the coated pigment in the form of ground dried lump, wet cake, a slurry of the coated pigment in water or a suitable organic diluent, or the pigment slurry resulting from the coating step. Preferably, the liquid organopolysiloxane, as a solution in a suitable organic solvent such as ethanol, butanol, isopropanol, acetone, amylacetate, benzene, toluene, cyclohexane, and the like, is added to a slurry of the coated pigment in water or an inert organic diluent and the mixture is ground or vigorously agitated at room temperature in a Waring blender, osterizer or other high speed mixer for from 0.5 to 30 minutes and preferably from 1 to 15 minutes. The liquid polysiloxane can also be applied directly, as by sprinkling on the dry coated pigment and then grinding the wetted pigment in a high speed grinding device. Although the energy requirements of the latter technique are higher, it offers the distinct advantage of reducing dusting while providing a product of increased density. Regardless of the manner in which the liquid polysiloxane is applied to and contacted with the coated pigment particles, this step of the process should be carried out under conditions which do not materially change the liquid form of the polysiloxane. Usually, the contacting will be at room or slightly elevated temperatures although temperatures up to about 100° C. can be used if desired.

The resulting pigment is recovered conventionally. If the contacting with the liquid polysiloxane has been conducted using a slurry of the coated pigment particles, the usual practice is to separate the pigment from the diluent by filtration or evaporation, followed by washing if desired and drying at a temperature of 100° C. or below.

The organopolysiloxanes employed in this invention are liquid polymers composed of linear chains with alternating silicon and oxygen atoms and the remaining bonds of each silicon atom are connected to hydrocarbon substituents by silicon-carbon linkages. Such polysiloxanes contain repeating units of the formula

where R and R' are hydrocarbyl groups and preferably are alkyl, aryl, alkaryl, aralkyl or cycloalkyl groups. The R and R' groups can be alike or different. Preferred alkyl groups contain up to 6 carbon atoms and include methyl, ethyl, propyl, butyl, etc. Aryl, alkaryl and aralkyl groups containing up to 10 carbon atoms such as phenyl, tolyl, xylyl, benzyl, naphthyl, etc., and cycloalkyl groups containing up to 6 carbon atoms such as cyclohexyl are also suitable. Particularly preferred liquid organopolysiloxanes are the relatively low molecular weight polymers of dialkylsiloxanes having viscosities in the range of bout 0.65 to about 100,000 centistokes. The most preferred polymers are Dow Corning Corp.'s DC 200 fluids and General Electric Co.'s G.E. Silicone oils in which both R and R' are lower alkyl and usually methyl.

The amount of liquid polysiloxane which will provide the advantages of this invention can be varied over relatively wide limits. As little as about 1% based on the weight of the silica-coated pigment particles results in decided improvement in heat stability, dispersibility and abrasion resistance and as the amount is increased up to about 15% the resistance of the pigments to mechanical destruction and heat degradation is further increased. Amounts above about 15%, however, have not been found to confer additional advantages and, since they further extend the pigment, thereby decreasing toner value, and also tend to decrease the free-flowing nature of the pigment, are not recommended.

The invention is further illustrated by the following examples in which all parts and percentages are by weight unless otherwise indicated.

EXAMPLE 1

A vessel equipped with an agitator and heating means was charged with 200 parts of a commercial, medium chrome yellow, monoclinic lead chromate pigment (CI 77600) and 4000 parts of water and the charge was agitated to form a uniform slurry. Sufficient caustic soda was next added to adjust the pH of the slurry to 9.5 and heat was applied to raise and maintain the temperature at 95° C. While continuing agitation, a solution containing 220 parts of water glass (28.5% $SiO_2$; $SiO_2$/$Na_2O$ ratio of 2.2/1) and 9 parts of caustic soda and a solution containing 32 parts of 94% sulfuric acid were slowly and simultaneously added to the slurry over a period of 3 hours. Agitation was continued for an additional 30 minutes at 95° C. after which time an aqueous solution of 30 parts of hydrated aluminum sulfate (equivalent to 5 parts of $Al_2O_3$) was added and the pH was adjusted to 6.0–6.5 with caustic soda. The pigmentary product was isolated from the aqueous medium, washed, dried at 82° C. and Raymond milled. The dried product was lead chromate particles having deposited on their surfaces a substantially continuous coating of 23.5% of dense amorphous silica and 1.9% of alumina, based on the dry product weight. This product was labeled pigment 1A.

A Waring blender was charged with 50 parts of the dry silica/alumina coated pigment produced above (pigment 1A) and 4.5 parts of a liquid poly(dimethyl) siloxane having a viscosity of 100 centistokes (Dow Corning trade designation DC 200) were sprinkled over the charge. Blending was commenced and continued for five minutes at room temperature, following which time the charge was removed from the blender and the resulting pigment was recovered. The pigmentary product of this example (labeled pigment 1) was free-flowing and contained 9.0% of poly(dimethyl)siloxane, based on the silica/alumina-coated pigment weight.

A poly(dimethyl) siloxane-coated control pigment was also prepared by charging the Waring blender with 50 parts of the medium yellow lead chromate pigment (CI 77600), sprinkling 4.5 parts of the DC 200 liquid poly(dimethyl)siloxane used above over the charge, blending the charge for 5 minutes at room temperature and then recovering the resulting pigment. This control pigment, labeled pigment 1B, contained 9% of poly(- dimentyl)siloxane based on the weight of the medium chrome yellow pigment.

The pigment of this example (pigment 1), the two control pigments (pigments 1A and 1B) and the untreated medium chrome yellow pigment (pigment 1C) were each evaluated in samples of polystyrene at the 2% level by dry blending 2 parts of the pigment with 98 parts of commercial injection-grade polystyrene granules, passing the blended sample twice through a Sterling, 1 inch laboratory extruder at 193° C. and then injection molding the extrudate into 2 sets of rectangular test chips using a 3 ounce, 75 ton injection molding machine. An injection temperature of 193° C. and a dwell time of 30 seconds were used for one set and an injection temperature of 288° C. and a dwell time of 30 seconds were used for the second set. Heat stability of the test chips was evaluated by visually examining and comparing the test chips of each set, using a rating scale of 1 to 5 to denote color differences. On this scale the integer 1 was assigned to the cleanest chip of each set (least degree of darkening) and the integers 2 to 5 were used to denote the following degrees of change.

2 — slightly darker than 1
3 — appreciably darker than 1
4 — notably darker than 1
5 — much darker than 1

The molded chips were also compared and rated in order of degree of sample darkening due to elevation of the molding temperature from 193° C. to 288° C. In this evaluation the letter A was assigned to the pigmented sample which exhibited the least degree of change and the letters B, C and D in that order were used to designate larger degrees of change in alphabetical order. The results of the evaluations are tabulated below.

| Pigmented Polystyrene Sample | Molding Temperature | | Degree of Darkening |
|---|---|---|---|
| | 193° C. | 288° C. | |
| pigment 1 | 1 | 1 | A |
| pigment 1A | 2 | 4 | B/C |
| pigment 1B | 2 | 4 | B/C |
| pigment 1C | 4 | 5 | D |

From the above tabulation it is readily apparent that the pigment of this example was distinctly more heat stable in polystyrene than either of the treated or the nontreated control pigments. The results further indicate that the pigment of this example exhibited improved resistance to abrasion, shear or impact during compounding. The dispersibility characteristics of the pigment of this example in polystyrene were excellent and there was no evidence of residue in the blending vessel or extruder.

EXAMPLE 2

The vessel of Example 1 was charged with 200 parts of the medium chrome yellow pigment of Example 1 (CI 77600) and 4000 parts of water and the charge was agitated to form a uniform slurry. Sufficient caustic soda was next added to adjust the pH of the slurry within the range of 6.0 to 7.0 and the slurry was heated to 95° C. While continuing agitation 212 parts of water glass (28.5% $SiO_2$; $SiO_2/Na_2O$ ratio of 3.2) and 24 parts of ammonium chloride as a 6% aqueous solution were slowly and simultaneously added over a period of 3 hours, following which time 30 parts of alum (equivalent to 5.2 parts of $Al_2O_3$) were added to facilitate filtration. The resulting suspension was separated into 2 equal portions and one portion was filtered, washed, dried at 93° C. for 16 hours and ground. The dried portion was lead chromate particles containing a substantially continuous coating of 22.8% of $SiO_2$ and 2% of $Al_2O_3$ based on the coated pigment weight and was labeled pigment 2A. To the remaining portion was added, with agitation, at room temperature a solution of 7.3 parts of the polysiloxane used in Example 1 in 7.3 parts of ethyl alcohol. Agitation was continued for 15 minutes following which the suspension was filtered, washed, dried at 93° C. for 16 hours and ground. This pigment (labeled pigment 2) was free-flowing and contained 5.5% of poly(dimethyl)siloxane based on the weight of the silica/alumina-coated pigment.

A chrome yellow control pigment and a poly(dimethyl)-siloxane-coated chrome yellow control pigment were also prepared by slurrying 200 parts of the medium chrome yellow pigment (CI 77600) in 4000 parts of water, adjusting the pH of the slurry to between 6.0 and 7.0, and separating the slurry into 2 equal portions. The first portion was filtered, washed, dried at 93° C. for 16 hours and ground. This pigment was labeled pigment 2C. To the remaining portion of the slurry was added at room temperature a solution of 5.5 parts of the poly(dimethyl)siloxane in 5.5 parts of ethyl alcohol and the slurry was agitated for 15 minutes, following which time the resulting suspension was filtered, washed, dried at 93° C. for 16 hours and ground. This portion of the pigment contained 5.5% of poly(dimethyl)siloxane based on the weight of the medium chrome yellow pigment and was labeled pigment 2B.

The pigment of this example and the control pigments 2A, 2B and 2C were evaluated in polystyrene at the 2% level using the procedure and rating systems of Example 1. Results of the evaluation are tabulated below.

| Pigmented Polystyrene Sample | Molding Temperature | | Degree of Darkening |
|---|---|---|---|
| | 193° C. | 288° C. | |
| pigment 2 | 1 | 1 | A |
| pigment 2A | 2 | 3 | B |
| pigment 2B | 2 | 4 | C |
| pigment 2C | 4 | 5 | D |

Color measurements were also made spectrophotometrically on the test chips molded at 288° C. using the CIE tristimulus system described in "Principles of Color Technology", by Billmeyer and Saltzman, pages 31–45, Interscience Publ. Co., N.Y. (1966). Color differences in MacAdam units were calculated therefrom using the equation $$E = \sqrt{\Delta C^2 + \Delta L^2}$$

where E = the overall color difference of the sample
$\Delta C$ = difference in chromaticity (hue and saturation) between sample and control and
$\Delta L$ = difference in lightness (+) or darkness (−) on a grey scale between sample and control.

The color values obtained by comparing the chips containing the pigment of this example with the chips containing pigment 2A or pigment 2B (control for the above calculations) are reported in Table I, below.

Analyses of the data of the Table further confirms the visual observations that the pigment of this example has improved heat stability and resistance to destruction than does either the silica/alumina-coated control pigment 2A or the polysiloxane-coated control pigment 2B. The observations are further supported by the reflectance curves shown in the accompanying FIG. 1. The curves shown in FIG. 1 are the reflectance readings at various wavelengths ranging from 380 to 700 millimicrons for 2% pigmented polystyrene samples molded at 288° C. as a percent of the reflectance readings for a pure white barium sulfate standard, the readings being made with a General Electric recording spectrophotometer. More specifically, a comparison of the curves shows that the pigment of this example reflects approximately 5% more light in the yellow-orange region than pigments 2A and 2B and further confirms that improved dispersibility, heat stability and resistance to abrasion, shear and impact are achieved by the practice of this invention.

EXAMPLE 3

Two hundred parts of a lemon yellow lead sulfochromate pigment (CI 77603) were slurried and treated with water glass and alum according to the procedure of Example 2, following which the suspension was filtered, washed, dried at 93° C. for 16 hours and ground. The product contained 22.8% of $SiO_2$ and 2% of $Al_2O_3$, based on total weight, as a substantially continuous coating on the pigment particles and was labeled pigment 3A.

To a slurry of 50 parts of pigment 3A and 196 parts of ethyl alcohol in an agitated vessel was added with agitation a solution of 4.5 parts of the polysiloxane of Example 1 in 8 parts of ethyl alcohol. Vigorous agitation was carried out for 5 minutes, following which time the resulting color was recovered from the slurry by filtration, dried at 93° C. for 16 hours and ground. The pigment of this example (pigment 3) was free-flowing and contained 9% of the polysiloxane by weight of the silica/alumina-coated pigment.

A control pigment 3B was also prepared in the manner set forth above by slurrying 50 parts of the lemon yellow chrome pigment (CI 77603) in 250 parts of ethyl alcohol, agitating the slurry with 4.5 parts of the polysiloxane in 8 parts of ethyl alcohol and recovering as above. Pigment 3B contained 9% of the polysiloxane based on the weight of the lemon yellow chrome pigment.

The pigment of this example and control pigments 3A and 3B were evaluated visually in polystyrene according to the procedure of Example 1 and the results of this evaluation are tabulated below.

| Pigmented Polystyrene Sample | Molding Temperature 193° C. | 288° C. | Degree of Darkening |
|---|---|---|---|
| pigment 3 | 1 | 1 | A |
| pigment 3A | 2 | 3 | B |
| pigment 3B | 2 | 4 | C |

Color measurements were made spectrophotometrically on the test chips and color differences were calculated according to the procedure of Example 2. The color values obtained by comparing the chips containing the pigment of this example with the chips containing pigment 3A or pigment 3B are reported in Table I, below.

Analyses of the visual and spectrophotometric data confirm that the pigment of this example exhibits improved dispersibility, heat stability and resistance to destruction in polystyrene than either of the control pigments.

EXAMPLE 4

Two hundred parts of the lemon yellow lead chromate pigment of Example 3 were slurried and treated with water glass and alum according to the procedure of Example 3. The dried and ground product contained 22.8% of $SiO_2$ and 2% of $Al_2O_3$ based on the weight of the silica/alumina-coated pigment as a substantially continuous coating on the pigment particles and was labeled pigment 4A.

To a slurry of 90 parts of pigment 4A in 396 parts of acetone in an agitated vessel was added with agitation a solution of 10 parts of the polysiloxane of Example 1 in 10 parts of acetone. Vigorous agitation was carried out for 5 minutes, following which time the resulting product was recovered from the slurry by filtration, dried at 93° C. for 16 hours and ground. The pigment of this example (pigment 4) was free-flowing and containing 11% of polysiloxane, based on the weight of the silica/alumina-coated pigment.

A control pigment 4B was also prepared by: slurrying 90 parts of the lemon yellow lead chromate pigment in 396 parts of acetone; agitating the slurry with 10 parts of a polymerizable polysiloxane sold by Down Corning under the trade designation D-1107 which is a compound containing repeating units of formula 1, above, wherein the R and R' substituents are hydrogen and methyl, respectively; adding a solution of 0.13 part of an 8% commercial zinc octanoate solution in 8 parts of acetone; vigorously agitating the mixture for 5 minutes; filtering the product; drying at 93° C. for 16 hours; heating the dried product for 4 hours at 121° C.; and then grinding. This product, labeled pigment 4B, was an encapsulated lead chromate containing 11% of cured solid polysiloxane based on the weight of lemon yellow pigment.

The pigment of this example, control pigment 4A and 4B and the untreated lemon yellow lead chromate pigment (pigment 4C) were evaluated in polystyrene at the 2% level using the procedure of Example 1. Visual comparison of the test chips using the rating system of Example 1 gave the following results.

| Pigmented Polystyrene Sample | Molding Temperature 193° C. | 288° C. |
|---|---|---|
| pigment 4 | 1 | 1 |
| control pigment 4A | 2 | 3 |
| control pigment 4B | 2 | 4 |
| control pigment 4C | 4 | 5 |

Color measurements were also made spectrophotometrically on the test chips molded at 193° C. and 288° C. using the CIE tristimulus system described in Example 2. The change in lightness between samples molded at 288° C. and at 193° C. was measured by tabulating the differences in CIE Y values (relative luminosity system of Judd and Wyszecki, Color In Business, Science and Industry, 2nd Ed., John Wiley & Sons, Inc., N.Y., pages 42–43 (1963)). The results of this evaluation are tabulated below, a negative figure denoting the change was due to darkening.

|  | Change in lightness ($\Delta Y$) Of Chips Molded At 288° C. As Compared With Chips Molded At 193° C. (%) |
|---|---|
| pigment 4 | −14.0 |

| | Change in lightness (ΔY) Of Chips Molded At 288° C. As Compared With Chips Molded At 193° C. (%) |
|---|---|
| control pigment 4A | −18.3 |
| control pigment 4B | −28.2 |
| control pigment 4C | −31.3 |

Color differences in MacAdam units were calculated from the spectrophotometric data for the chips molded at 288° C. using the equation of Example 2, the control for these calculations being the corresponding chips molded at 193° C. The resuting color values are recorded below.

| | Overall Color Values - MacAdam Units | | |
|---|---|---|---|
| | Change in Chromaticity (ΔC) | Change in Lightness (ΔL)[a] | Overall Color Diff. (E) |
| pigment 4 | 23 | −20 | 30 |
| control pigment 4A | 30 | −26 | 40 |
| control pigment 4B | 42 | −40 | 58 |
| control pigment 4C | 53 | −44 | 69 |

[a]negative value denotes darkening

The relative luminosity and color differences in MacAdam units for the test chips molded at 288° C. were also compared with the values obtained on the chips containing control pigments 4A, 4B or 4C. The results of this comparison are tabulated below in Table I and demonstrate that the pigment of this example has improved dispersibility, heat stability and resistance to abrasion in polystyrene and provides pigmented products having a lighter, much cleaner and more saturated color than does either a silica/alumina-coated pigment (control 4A) or the cured polysiloxane encapsulated pigment (control 4B).

crons, as compared with a pure white barium sulfate standard, for polystyrene samples containing 2% of the pigment of Example 4 or control pigments 4A, 4B or 4C, and molded at two different temperatures, namely, 193° C. and 288° C. More specifically, a comparison of the curves for the samples molded at 193° C. shows that the color and cleanness of all of the pigmented samples are of about the same order, whereas a comparison of the curves for the samples molded at 288° C. shows that the pigment of this invention reflects in the yellow-orange region about 6% more light than the silica-alumina control pigment 4A, about 15% more light than the solid polysiloxane encapsulated control pigment 4B and about 22% more light than the untreated control pigment 4C. This comparison further substantiates that improved dispersibility, heat stability and resistance to abrasion are achieved by the practice of this invention.

What I claim and desire to protect by Letters Patent is:

1. In a pigment consisting essentially of lead chromate-containing particles having on their surfaces a substantially continuous coating of dense amorphous silica, dense amorphous silica and alumina or a solid, glass-like alkali polysilicate, the improvement which comprises said pigment particles having absorbed on the coated surfaces thereof a liquid organopolysiloxane containing repeating units of the formula

where R and R' are hydrocarbyl groups in an amount from 1 to 15% of the weight of the coated particles, the improved pigment being free-flowing and having in thermoplastic systems improved dispersibility characteristics, heat stability and resistance to mechanical destruction by abrasion, shear or impact.

TABLE I

| Pigmented Chips Compared | Color Differences In MacAdam units | | | Hue[a] | Lightness | Saturation[b] | Relative Luminosity[c] (CIE Y%) |
|---|---|---|---|---|---|---|---|
| | Chromaticity (ΔC) | Lightness (ΔL) | Overall Color (E) | | | | |
| Pigment 2 vs control 2A | 0.5 | 5.5 | 5.5 | greener (½) | lighter (5½) | more (½) | — |
| Pigment 2 vs control 2B | 4.9 | 4.2 | 6.5 | redder (1) | lighter (4) | more (4) | — |
| Pigment 3 vs control 3A | 1.9 | 8.3 | 8.6 | redder (½) | lighter (8½) | more (1½) | — |
| Pigment 3 vs control 3B | 6.3 | −1.0 | 6.4 | redder (4½) | darker (1)[d] | more (3) | — |
| Pigment 4 vs control 4A | 5.1 | 7.7 | 9.4 | — | — | — | +4.3 |
| Pigment 4 vs control 4B | 15.0 | 24.0 | 28.0 | — | — | — | +11.7 |
| Control 4B vs control 4C | 7.0 | 11.9 | 13.8 | — | — | — | +5.4 |

[a]Difference measured along an axis of constant saturation.
[b]Difference (measured along an axis of constant hue) is a direct measurement of color cleanness since no white is involved.
[c]A plus difference indicates that the sample is lighter or brighter than the reference sample.
[d]The surface area viewed was slightly non-planar; visual observations denoted that the chip containing pigment 3 was actuatlly cleaner and lighter than the chip containing control pigment 3B.

The above analyses are further supported by the reflectance curves shown in the accompanying FIG. 2. The curves of FIG. 2 are the reflectance readings at various wavelengths varying from 380 to 700 millimi- 2. The pigment of claim 1 wherein R and R' of the formula are the same or a different alkyl, aryl, alkaryl, aralkyl or cycloalkyl group.

3. The pigment of claim 2 wherein R and R' are methyl.

4. The pigment of claim 3 wherein the substantially continuous coating is dense amorphous silica and alumina.

5. The pigment of claim 4 wherein the lead chromate is substantially pure monoclinic lead chromate.

6. The pigment of claim 4 wherein the lead chromate is a solid solution of lead chromate and lead sulfate or lead chromate, lead sulfate and lead molybdate.

7. In a process for producing a coated lead chromate-containing pigment, said process including the step of depositing a substantially continuous coating of dense amorphous silica, dense amorphous silica and alumina or a solid, glass-like alkali polysilicate on the surfaces of particles of said pigment, the improvement which comprises contacting the coated pigment particles with from 1 to 15% of the weight of the coated particles of a liquid organopolysiloxane containing repeating units of the formula

where R and R' are hydrocarbyl groups and then recovering the resulting pigment, said contacting and recovering steps being carried out under conditions which do not effect substantial polymerization or curing of the organopolysiloxane and whereby the liquid organopolysiloxane is absorbed on the coated surface of the particles.

8. The process of claim 7 wherein R and R' of the formula are alike or different alkyl, aryl, alkaryl, aralkyl or cycloalkyl group.

9. The process of claim 8 wherein R and R' are methyl.

10. The process of claim 9 wherein the substantially continuous coating is dense amorphous silica and alumina.

* * * * *